United States Patent
Christoffersson et al.

(10) Patent No.: US 10,548,170 B2
(45) Date of Patent: Jan. 28, 2020

(54) METHOD, DEVICE, COMPUTER-READABLE STORAGE AND CARRIER FOR RANDOM ACCESS

(71) Applicant: Telefonaktiebolaget LM Ericsson (publ), Stockholm (SE)

(72) Inventors: Jan Christoffersson, Luleå (SE); Jinhua Liu, Beijing (CN); Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/370,487

(22) Filed: Mar. 29, 2019

(65) Prior Publication Data

US 2019/0230715 A1    Jul. 25, 2019

Related U.S. Application Data

(63) Continuation of application No. PCT/SE2018/051113, filed on Oct. 30, 2018.

(30) Foreign Application Priority Data

Nov. 15, 2017  (WO) ............... 2017/111100

(51) Int. Cl.
*H04W 74/08* (2009.01)
*H04W 76/11* (2018.01)
(Continued)

(52) U.S. Cl.
CPC ... *H04W 74/0833* (2013.01); *H04W 72/0446* (2013.01); *H04W 72/14* (2013.01); *H04W 76/11* (2018.02)

(58) Field of Classification Search
CPC ............................................... H04W 74/0833
(Continued)

(56) References Cited

U.S. PATENT DOCUMENTS

2017/0215207 A1    7/2017  Yi et al.
2018/0249510 A1*   8/2018  Lee .................. H04W 24/02
2019/0141742 A1*   5/2019  Zhou ................ H04W 72/048

FOREIGN PATENT DOCUMENTS

EP    2 761 955 A0    8/2014
EP    2761955 B1      7/2017
(Continued)

OTHER PUBLICATIONS

International Search Report and Written Opinion of the International Searching Authority, PCT/SE2018/051113, dated Jan. 24, 2019, 12 pages.
(Continued)

*Primary Examiner* — Peter G Solinsky
(74) *Attorney, Agent, or Firm* — Sage Patent Group

(57) ABSTRACT

The present disclosure provides a method a user equipment (UE) to perform random access to a radio network comprising an uplink physical resource configuration (UL) and supplementary physical resource configuration (SUL). A random access request containing a preamble may be transmitted from the UE to the radio network on a physical random access channel (PRACH) of one of the uplink physical resource configuration or the supplementary uplink physical resource configuration. A random access response for the UE indicating the physical resource configuration on whose PRACH the random access request was sent may be received at the UE, wherein the indication is made by a Random Access Radio Network Temporary Identifier (RA-RNTI) used to identify the random access response. The radio network may be accessed by the UE based on information in the random access response.

14 Claims, 5 Drawing Sheets

(51) Int. Cl.
*H04W 72/04* (2009.01)
*H04W 72/14* (2009.01)

(58) Field of Classification Search
USPC .......................................................... 370/329
See application file for complete search history.

(56) References Cited

FOREIGN PATENT DOCUMENTS

| WO | WO 2013/049768 A1 | 4/2013 |
| WO | WO 2017/065468 A1 | 4/2017 |
| WO | WO 2018/237133 A1 | 12/2018 |

OTHER PUBLICATIONS

"LTE; Evolved Universal Terrestrial Radio Access (E-UTRA); Medium Access Control (MAC) protocol specification (3GPP TS 36.321 version 12.2.1," Release 12) ETSI TS 136 321 V12.2.1 (Oct. 2014) 58 pages.

"Technical Specification Group Radio Access Network; Evolved Universal Terrestrial Radio Access (E-UTRA); Multiplexing and channel coding (Release 11)," 3GPP TS 36.212 V11.2.0 (Feb. 2013), 82 pages.

Communication pursuant to Article 94(3) EPC, European Application No. 18 799 610.3, dated Oct. 14, 2019, 6 pages.

\* cited by examiner

METHOD, DEVICE, COMPUTER-READABLE STORAGE AND CARRIER FOR RANDOM ACCESS

CROSS REFERENCE TO RELATED APPLICATIONS

This application is a by-pass continuation of PCT International Application No. PCT/SE2018/051113 filed on Oct. 30, 2018, which is a Continuation of PCT International Application No. PCT/CN2017/111100 filed on Nov. 15, 2017, the disclosures and content of which are incorporated by reference herein in their entirety. This application is also related to U.S. application Ser. No. 16/321,719 filed Jan. 29, 2019, the disclosure and content of which are incorporated by reference herein in their entirety.

TECHNICAL FIELD

The present disclosure generally relates to the technical field of wireless communications, and particularly, to a method, device, computer-readable storage and carrier for random access.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

One of the most basic requirements for any cellular system is the possibility for a User Equipment (UE) to initially request a connection setup to a network side (e.g., a Base Station (BS) or an eNodeB (eNB) in Long-Term Evolution (LTE) or any other appropriate BS that can guide the UE to establish a connection to the network), commonly referred to as random access. In LTE, the random access procedure comes in two forms, allowing access to be either contention-based or contention-free.

In a contention-based random access procedure, a preamble is randomly chosen by a UE from a preamble group, with the result that it is possible for more than one UE to simultaneously transmit the same preamble (i.e., a contention occurs), leading to a need for a subsequent contention resolution process. The smaller the total number of preambles available in the contention-based random access procedure is, the higher the contention possibility becomes.

For a contention-free random access procedure, the network side has the option of preventing contention occurring by allocating a dedicated preamble to a UE, resulting in contention-free access. This procedure is constrained to a limited amount of available preambles. That is, the smaller the total number of preambles available in the contention-free random access procedure is, the bigger the total number of preambles available in the contention-based random access procedure is, the lower the contention possibility becomes.

The evolving 5th Generation (5G) standard New Radio (NR) is aiming to operate in a wide range of frequencies from below 1 GHz up to 100 GHz. At high frequencies, it is well known that coverage will be an issue. One way to mitigate this is the introduction of a Supplementary Uplink (SUL) carrier which is mainly motivated by improvement of the uplink coverage for NR which is deployed at relative high frequency bands. The SUL carrier is deployed at the low frequency region, for example, at the LTE band. In this way, the uplink coverage of NR bands can be comparable with that in LTE. SUL carrier and NR UL/DL(Down Link) carrier are in the same cell. In this case, the SUL carrier belongs to more like a separate UL configuration. The UE can maintain two UL configurations, but the UE may keep only one UL configuration active. FIG. 1 illustrates the coverage differences between the NR UL carrier and the SUL carrier. The NR UL carrier covers a smaller area than the SUL carrier.

Problems occurs when UEs of the two uplink physical resource configurations (NR UL and SUL) choose the same preamble for contention-based random access request, as there are no contention resolution for such a scenario. Once a grant is issued for only one of the colliding UEs, each of the UEs will take it as a grant for itself and then an error occurs.

SUMMARY

It is therefore objects of the present disclosure to address or at least partially address the above mentioned problems.

According to one embodiment of the disclosure, there is provided a method for a user equipment, UE, to perform random access to a radio network, comprising: transmitting, from the UE, a random access request containing a preamble to the radio network on a physical random access channel, PRACH, of an uplink physical resource configuration; receiving, at the UE, a random access response for the UE indicating the uplink physical resource configuration on whose PRACH the random access request was sent; and accessing, by the UE, the radio network based on information in the random access response.

According to another embodiment of the disclosure, there is provided a method for a network device to control random access of one or more User Equipments, UEs, to a radio network, comprising: receiving, from the UE, a random access request containing a preamble on a physical random access channel, PRACH, of an uplink physical resource configuration; determining parameters for a random access response for the UE; and transmitting, by the network device, the random access response indicating the uplink physical resource configuration on whose PRACH the preamble is sent to the UE.

According to a third embodiment of the disclosure, there is provided a user equipment, UE, operative in a radio network, to perform random access to the radio network, comprising: a transmitting component, configured to transmit a random access request containing a preamble to the radio network on a physical random access channel, PRACH, of an uplink physical resource configuration; a receiving component, configured to receive a random access response for the UE indicating the uplink physical resource configuration on whose PRACH the random access request was sent; and an accessing component, configured to enable the UE to access the radio network based on information in the random access response.

According to a fourth embodiment of the disclosure, there is provided a network device, operative in a radio network, to control random access of one or more User Equipments, UEs, to the radio network, comprising: a receiving component, configured to receive, from a UE, a random access request containing a preamble on a physical random access channel, PRACH, of an uplink physical resource configuration; a determining component, configured to determine parameters for a random access response for the UE; and a transmitting component, configured to transmit the random access response indicating the uplink physical resource configuration on whose PRACH the random access request was sent to the UE.

According to a fifth embodiment of the disclosure, there is provided a communication device in a radio network, comprising: a storage, adapted to store data and instructions therein; a processing component, adapted to perform the steps of any of the methods here; and a network interface, adapted to communicate data with other entities in the radio network.

According to a sixth embodiment of the disclosure, there is provided one or more computer-readable storage storing computer-executable instructions thereon, when executed by a computing device, causing the computing device to implement the method of any of any of the methods here.

According to a seventh embodiment of the disclosure, there is provided a device adapted to perform any of the methods here.

According to a eighth embodiment of the disclosure, there is provided a computer program, comprising instructions which, when executed on at least one processor, cause the at least one processor to carry out the method according to any one of the methods here.

According to a ninth embodiment of the disclosure, there is provided a carrier containing the computer program of the eighth embodiment, wherein the carrier is one of an electronic signal, optical signal, radio signal, or computer readable storage.

As a whole or by scenario, comparing to the prior art, with random access response's capability of indicating the uplink physical resource configuration on whose PRACH the random access request was sent, the UEs of different uplink physical resource configurations that involve preamble conflicts will be able to interpret the random access response correctly.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and details through use of the accompanying drawings.

DETAILED DESCRIPTION

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein, for example, "preamble" should be construed as "random access preamble" herein.

Figure 1:
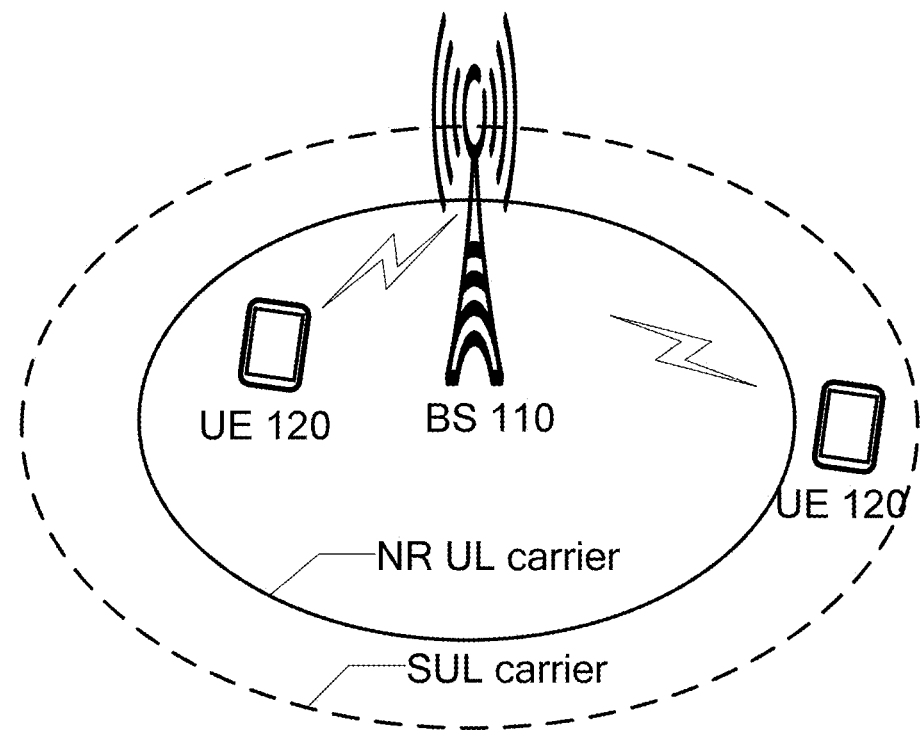
FIG. 1 illustrates coverage differences between a NR UL carrier and a SUL carrier.

FIG. 1 schematically shows a networking environment in which embodiments of the present disclosure are employed. Though only one Base Stations (BS) is shown, it is noted that without any loss of any generality, there could be any number of BSs providing different radio coverage in respective cells communicating over respective air interfaces with User Equipment (UE) operating on radio frequency bands within their range. As shown in FIG. 1, as for BS 110 for example, it is serving for two UEs, i.e., two UEs 120, A and B in its cell. The BS in 5G radio network is referred to as "gNB", and covers both an area of the solid line circle with a 5G uplink (which is also referred to as New Radio uplink, NR UL) carrier and a bigger area of dash line circle with the supplementary uplink (SUL) carrier.

In the present disclosure, the UE may be a communication device also known as a mobile terminal, and/or a wireless terminal, which is enabled to communicate wirelessly with a transmitter in a radio network, sometimes also referred to as a cellular radio system. For instance, a communication device may be, but not limited to, a mobile phone, a smart phone, a sensor device, a meter, a vehicle, a household appliance, a medical appliance, a media player, a camera, or any type of consumer electronic, for instance, but not limited to, a television, a radio, a lighting arrangement, a tablet computer, a laptop, or a Personal Computer (PC). The communication device may be a portable, pocket-storable, hand-held, computer-comprised, or vehicle-mounted mobile device, enabled to communicate voice and/or data, via a wireless connection.

In one example, when a UE 120 performs random access when a SUL is configured, there may be two options for the RA. Either the RA is performed on the NR UL carrier or the RA is performed on the SUL carrier. In principle, the NR UL carrier should be used when the UE is within coverage of the NR UL carrier and if not, the SUL carrier should be used. Irrespective of which UL carrier is used for the preamble transmission, the Random Access Response (RAR) will be transmitted on the NR DL (DownLink) carrier. The UE 120 needs to determine if its transmitted preamble has been received by the gNB 110. In LTE, this is determined from a Random Access Preamble IDentifier (RAPID) and a Random Access Radio Network Temporary Identifier (RA-RNTI). If these match to the preamble transmitted by the UE and the PRACH occasion when the preamble was sent, the UE concludes that its transmitted preamble was received and allows itself to use the grant supplied in the RAR.

Figure 2:
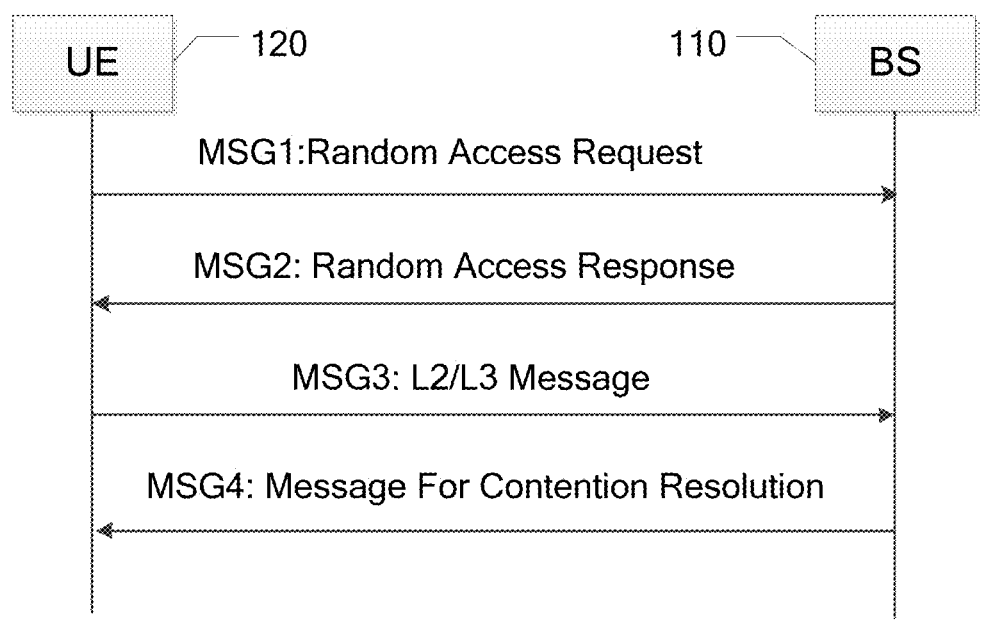
FIG. 2 illustrates traditional contention-based random access procedure in LTE.

FIG. 2 illustrates traditional random access procedure in LTE, which consists of the following four steps:
Step 1: Random access preamble transmission (MSG1);
Step 2: Random access response (MSG2);
Step 3: Layer 2/Layer 3 (L2/L3) message (MSG3);
Step 4: Contention resolution message (MSG4).

What is shown in FIG. 2 is a contention-based random access procedure, while the conventional contention-free random access procedure is similar to that except for Step 4.

In the contention-based random access procedure, at Step 1, the UE selects one of preambles available in the contention-based random access procedure, e.g., 64-$N_{cf}$ as specified in LTE, where $N_{cf}$ is the number of preambles reserved by the eNB for contention-free random access. Preambles available in the contention-based random access procedure are further subdivided into two subgroups of group A and group B so that the choice of a preamble can carry one bit of information relating to the amount of transmission resource needed to transmit MSG3. Broadcast system information indicates which preambles are in each of the two subgroups (each subgroup corresponding to one value of the one bit of information), as well as the meaning of each subgroup. The UE selects a preamble from one subgroup corresponding to the size of transmission resources needed for the appropriate RACH use case. Some use cases require only a few bits to be transmitted in MSG3, so choosing a smaller message size avoids allocating unnecessary uplink resources.

Once detecting the preamble in a time-frequency slot, the eNB determines an ID, e.g. RA-RNTI in LTE, identifying the time-frequency slot in which the preamble was detected. Then, at Step 2, the eNB sends a Random Access Response (RAR) addressed with the ID on the Physical Downlink Shared CHannel (PDSCH). If multiple UEs had collided by selecting the same preamble in the same preamble time-frequency resource, they would each receive the RAR.

The RAR conveys the identity of the detected preamble, i.e., RAPID, a timing alignment instruction to synchronize subsequent uplink transmissions from the UE, an initial uplink resource grant for transmission of the Step 3 message, and an assignment of a temporary Cell Radio Network Temporary Identifier (C-RNTI) (which may or may not be made permanent as a result of the next step—contention resolution). The RAR is scrambled with the RA-RNTI and indicates the PRACH resource on which the preamble was transmitted. The UE expects to receive the RAR within a time window, of which the start and end are configured by the eNodeB and broadcast as part of the cell-specific system information. If the UE does not receive a RAR within the configured time window, it selects another preamble to be transmitted again.

Once the preamble is transmitted and regardless of the possible occurrence of a measurement gap, the UE shall monitor the Physical Downlink Control Channel (PDCCH) for RAR(s) identified by the RA-RNTI defined below within the time window.

According to 3GPP specification 36.321-c80 Section 5.1.4, v12.2.1, the RA-RNTI associated with the PRACH on which the preamble is transmitted for the ordinary LTE is computed according to the following:

$$\text{RA-RNTI}=1+t\_id+10*f\_id \quad (1)$$

Where t_id is the index of the first subframe of the specified PRACH ($0 \leq t\_id < 10$), and f_id is the index of the specified PRACH within that subframe, in ascending order of frequency domain ($0 \leq f\_id < 6$).

For FDD LTE, for example, f_id is fixed as 0. Hence, RA-RNTI is determined by the transmission timing of subframe of the PRACH Preamble transmission by the UE. As there are 10 subframes per radio frame, there are only 10 different values for RA-RNTI within LTE.

For NR, the formula is updated by allowing a higher number of t_id (which may indicate slots) according to $$\text{RA-RNTI}=1+t\_id+X*f\_id \quad (2)$$

Where t_id refers to the slot where the preamble transmission starts and X is the maximum number of slots per radio frame and f_id is the index of the specified PRACH within that subframe, in ascending order of frequency domain ($0 \leq f\_id < X$).

At Step 3, the UE transmits Layer 2/Layer 3 (L2/L3) Message to the eNB by using resource indicated by the RAR. This message is the first scheduled uplink transmission on the PUSCH and makes use of Hybrid Automatic Repeat reQuest (HARQ). It conveys the actual random access procedure message, such as an RRC connection request, tracking area update, or scheduling request. It includes a C-RNTI allocated in the RAR at Step 2 and either the C-RNTI if the UE already has one (RRC_CONNECTED UEs) or the (unique) 48-bit UE identity. In case of a preamble collision occurring at Step 1, the colliding UEs will receive the same Temporary C-RNTI through the RAR and will also collide in the same uplink time-frequency resources when transmitting their L2/L3 messages. This may result in such interferences that no colliding UEs can be decoded, and the UEs restart the random access procedure after reaching the maximum number of HARQ retransmissions. However, if one UE is successfully decoded, the contention remains unresolved for the other UE. The following downlink message (in step 4) allows a quick resolution of the contention.

At step 4, the eNB transmits a contention resolution message to the UE. This message is the first scheduled uplink transmission on the PUSCH and makes use of HARQ. It is addressed to the C-RNTI (if indicated in the MSG3) or to the temporary C-RNTI, and, in the latter case, echoes the UE identity contained in MSG3. In case of a collision followed by successful decoding of the MSG3, the HARQ feedback is transmitted only by the UE which detects its own UE identity (or C-RNTI); other colliding UE(s) understand there was a collision, transmit no HARQ feedback, and can quickly exit the current random access procedure and start another one.

In the following descriptions, details similar to those of LTE described above with reference to FIG. 2 will not be discussed. Efforts are made to elucidate new points over prior art.

The following embodiments with reference to the following figures are described mainly in the context of a 5G network in which the UE supports 5G uplink physical resource configuration and 5G supplementary uplink physical resource configuration, however, it is understood that the embodiments are applicable to any radio network, with two or more uplink physical resource configurations, that enable contention-based random access.

Figure 3:
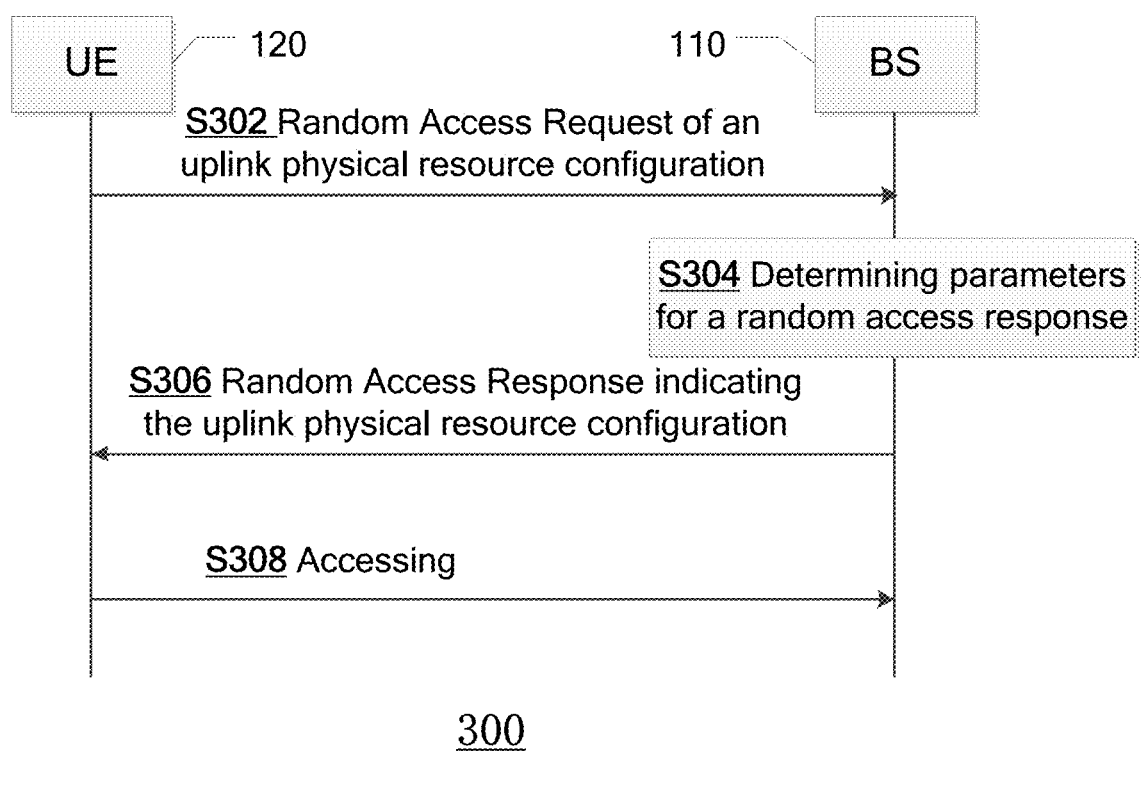
FIG. 3 illustrates a sequence diagram of a method 300 in a wireless communication system according to embodiments of the present disclosure.

FIG. 3 illustrates a sequence diagram of a method 300 in a radio communication system according to embodiments of the present disclosure, which communication system includes a UE 120 and a BS 110, such as gNB or any other BS responsible for controlling the UE 120's accessing to the corresponding network. The radio network here may be a 5G network, or any the other appropriate radio network.

As shown in FIG. 3, the method 300 begins with step S302, in which the UE 120 with one of a 5G uplink physical resource configuration and a 5G supplementary uplink physical resource configuration transmits a random access request to the BS 110. The random access request contains a preamble, which is, e.g., selected by the UE 120 from available predefined preambles, e.g., as is in LTE technology.

Once detecting the preamble in a time-frequency slot, the BS 110 determines parameters for a random access response, e.g., RA-RNTI identifying the time-frequency slot, at step S304. How the parameters are determined that differs from the prior art are described in details with reference to FIG. 4.

At step S306, the BS 110 transmits to the UE 120 the RAR corresponding to the preamble, indicating the uplink physical resource configuration on whose PRACH the random access request was sent. This step differs from MSG2 as shown in FIG. 1 mainly in capability of indicating the uplink physical resource configuration on whose PRACH the random access request was sent.

At step 308, the UE 120 accesses the radio network based on information in the random access response. With knowledge of the uplink physical resource configuration of the UE which the RAR aims at, the UE 120 will not misinterpret the RAR when preamble conflicts occur.

Figure 4:
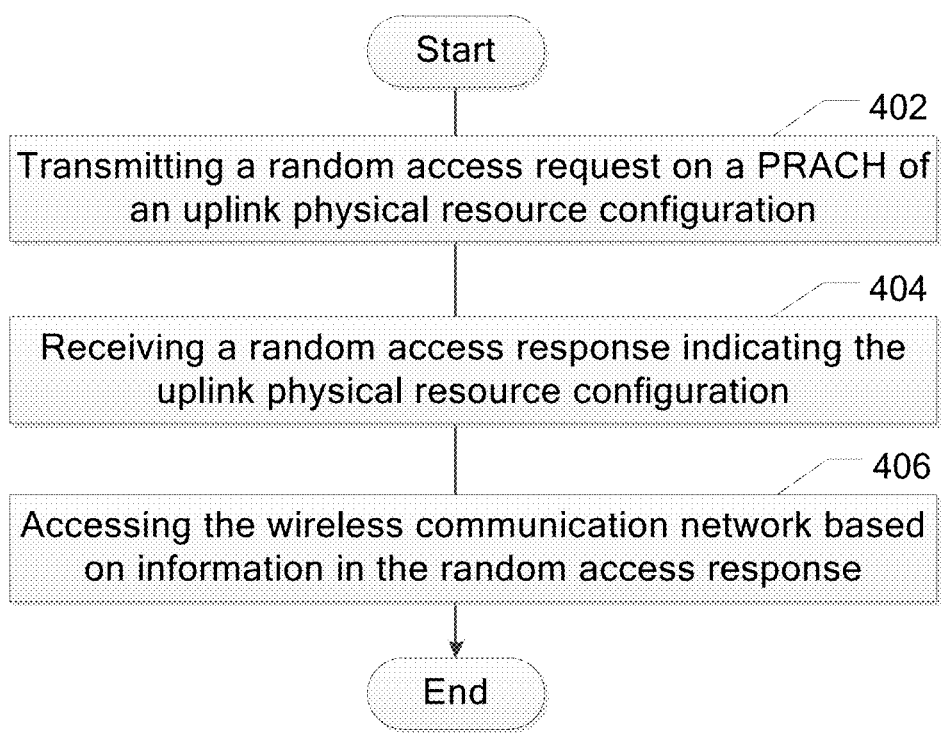
FIG. 4 illustrates a flowchart of a method 400 used in a UE for performing random access to a radio network according to embodiments of the present disclosure.

FIG. 4 shows a flowchart of a method 400 used in a UE for performing random access to a radio network according to embodiments of the present disclosure. The radio network is e.g., a 5G network as shown in FIG. 1, or any other appropriate radio network.

The method starts at step 402, the UE 120 transmits a random access request containing a preamble to the radio network on a physical random access channel, PRACH, of an uplink physical resource configuration, which could be one of e.g. a 5G uplink physical resource configuration operating at a higher frequency region, and a 5G supplementary uplink physical resource configuration operating at a lower frequency region.

At step 404, the UE receives a random access response for it, indicating the uplink physical resource configuration on whose PRACH the random access request was sent. How the random access response indicates the uplink physical resource configuration is discussed in detail below.

In some embodiments, the uplink physical resource configuration is indicated by the parameter of Random Access Radio Network Temporary Identity, RA-RNTI, in the random access response.

In one example, the RA-RNTI is calculated as follows:

$$RA\text{-}RNTI = 1 + t\_id + X * f\_id \quad (3)$$

wherein t_id refers to an index of a slot where the preamble transmission starts, f_id refers to an index of the PRACH within the slot, f_ids for different uplink physical resource configurations being all unique, e.g., f_ids for all uplink physical resource configurations being numbered consecutively—integers from 0 to n for a 5G uplink physical resource configuration, and integers from n+1 to m for a 5G supplementary uplink physical resource configuration, and X is the maximum number of slots per radio frame of different uplink physical resource configurations.

In another example, the RA-RNTI is calculated as follows:

$$RA\text{-}RNTI = 1 + t\_id + \max(X1, X2) * f\_id + \max(X1, X2) \\ * \max(Y1, Y2) * C\_id \quad (4)$$

wherein t_id refers to an index of slot where the preamble starts, f_id refers to an index of the PRACH within the slot, X1 is the number of slots per radio frame in a first uplink physical resource configuration, such as 5G uplink physical resource configuration, X2 is the number of slots per radio frame in a second uplink physical resource configuration, such as A 5G supplementary uplink physical resource configuration, Y1 is the number of PRACHs in frequency domain in the first uplink physical resource configuration, such as 5G uplink physical resource configuration, Y2 is the number of PRACHs in frequency domain in the second uplink physical resource configuration, such as a 5G supplementary uplink physical resource configuration, $0 \leq t\_id < \max(X1,X2)$, $0 \geq f\_id < \max(Y1,Y2)$, and C_id is the index of the uplink physical resource configuration on whose PRACH the random access request was sent, which is either the first uplink physical resource configuration or the second uplink physical resource configuration.

This would allow separate numberings and granularities for the t_id and f_id on PRACHs of different uplink physical resource configurations. For example, the low frequency SUL could have t_id of 0-9 when there are 10 slots on per radio frame and the high frequency NR UL could have t_id of 0-59 when there are 60 slots per radio frame. Also the frequency configurations could be independent for the different uplink physical resource configurations. For example, low frequency SUL could have f_id in the range 0-f1, while the high frequency NR UL could have f_id in the range 0-f2.

The UE understands if the preamble is acknowledged from DCI for UL grant carried by the RAR. If the scheduled radio resource for MSG3 via RAR is located on the SUL carrier, then the preamble sent on SUL is the one acknowledged, if the scheduled radio resource via RAR is located on the NR UL carrier, then the preamble sent on the NR UL carrier is the one acknowledged. Accordingly in some embodiments, the uplink physical resource configuration is indicated by the parameter of Downlink Control Information (DCI) in the RAR. In these embodiments, calculation of RA-RNTI may follow the legacy function (2) as mentioned above.

In one example, an index indicating the uplink physical resource configuration on whose PRACH the random access request was sent is contained in the DCI.

In another example, a Physical Resource Block (PRB) region identifying the uplink physical resource configuration on whose PRACH the random access request was sent is indicated in the DCI, e.g., via a pointer in the DCI pointing to the PRB. For example, the PRB regions 0 to M are assigned for indexing PRBs in the NR UL carrier, while the PRB regions M+1 to N are assigned for indexing PRBs in the SUL carrier.

In such above embodiments, the RA-RNTI does not indicate on whose uplink physical resource configuration the preamble was received. Instead this information is derived from the grant for MSG3. It is then easily conceived by one skilled in the art that if the RAR is received with a correct RAPID and RA-RNTI but the grant is not for the carrier where the preamble was transmitted, then the UE may ignore the grant. Instead it should re-transmit the preamble when the RAR time window has expired.

In some embodiments, the random access response comprises at least two grant fields dedicated for respective uplink physical resource configurations, to indicate grants of random access for the UE that sends random access requests in the respective uplink physical resource configurations, e.g., field A for 5G uplink physical resource configuration, value in field A indicating grant for the UE with 5G uplink physical resource configuration, and field B for 5G supplementary uplink physical resource configuration, value in field B indicating grant for the UE with supplementary uplink physical resource configuration. These fields act as an aid for the UE to interpret RA-RNTI in the random access response. In these embodiments, calculation of RA-RNTI also follows the legacy function (2) as mentioned above.

In some embodiments, the preambles for contention based random access are further divided into two groups dedicated for NR UL and SUL respectively, except for existing groupings for other purposes. For example, preambles in group A as defined in LTE are further divided into group C1 for NR UL and group D1 for SUL. Further, preambles in group B (if any) as defined in LTE are further divided into group C2 for NR UL and group D2 for SUL. In that case, the uplink physical resource configuration can be indicated by the group, be it C1, C2, D1 or D2. Different preambles indicating respective groups may be broadcast as part of the cell-specific system information At step 406, the UE accesses the radio network based on information in the random access response. For example, the UE 120 may proceed with transmitting MSG3 to gNB as shown in FIG. 2, as well as subsequent random access related processing, which will be apparent to those skilled in the art and thus will not be described in detail here.

The above various ways how the random access response indicates the uplink physical resource configuration are mainly described with reference to two uplink physical resource configurations—5G SUL and 5G NR UL. It is easily conceived by one skilled in the art that the above various ways may be applied similarly to a radio system comprising three or more uplink physical resource configurations. For example, in legacy function (2), f_id may be different for all uplink physical resource configurations. For another example, function (3) may be developed as:

$$RA\text{-}RNTI = 1 + t\_id + X * f\_id + X * Y * C\_id,$$

wherein t_id refers to an index of slot where the preamble transmission starts, f_id refers to an index of the PRACH within the slot, X is the maximum number of slots per radio frame of different uplink physical resource configurations, Y is the maximum number of PRACHs in frequency domain of different uplink physical resource configurations, $0 \le t\_id < X$, $0 \le f\_id < Y$, and C_id is the index of the uplink physical resource configuration on whose PRACH the random access request was sent.

For a third example, the index indicating the uplink physical resource configuration on whose PRACH the random access request was sent is able to identify more than simply two uplink physical resource configurations. For a fourth example, PRB regions may be divided into more than two groups, with each group indicating a respective uplink physical resource configuration. For a fifth example, each RAR may comprise more than two grant fields, with each field indicating a grant for a respective uplink physical resource configuration. For a sixth example, the preambles for random access in group A or further in group B are further divided into more than two groups dedicated for respective uplink physical resource configurations, except for existing groupings for other purposes.

Figure 5:
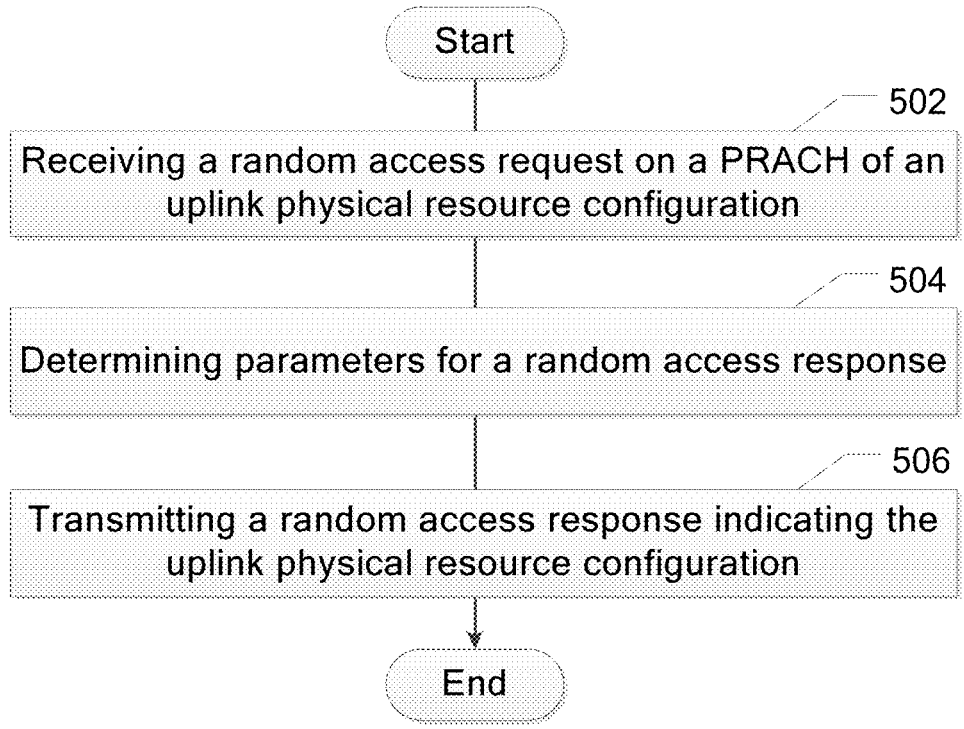
FIG. 5 illustrates a flowchart of a method 500 used in a BS for controlling random access of one or more UEs to the network device according to embodiments of the present disclosure.

FIG. 5 shows a flowchart of a method 500 used in a BS for controlling random access of one or more user equipments to the network device according to embodiments of the present disclosure. The network here may be a 5G network, or any other appropriate radio network.

The method starts at step 502, the BS 110 receives from the UE 120 a random access request containing a preamble on a PRACH of an uplink physical resource configuration, which could be one of e.g. a 5G uplink physical resource configuration operating at a higher frequency region, and a 5G supplementary uplink physical resource configuration operating at a lower frequency region.

At step 504, the BS 110 determines parameters for an RAR, the ways how the parameters in an RAR are determined have been discussed above with reference to FIGS. 3 and 4, and will not be reiterated here.

Then at step 506, the BS 110 transmits the RAR for the UE to the UE, indicating the uplink physical resource configuration on whose PRACH the random access request was sent in it.

Figure 6:
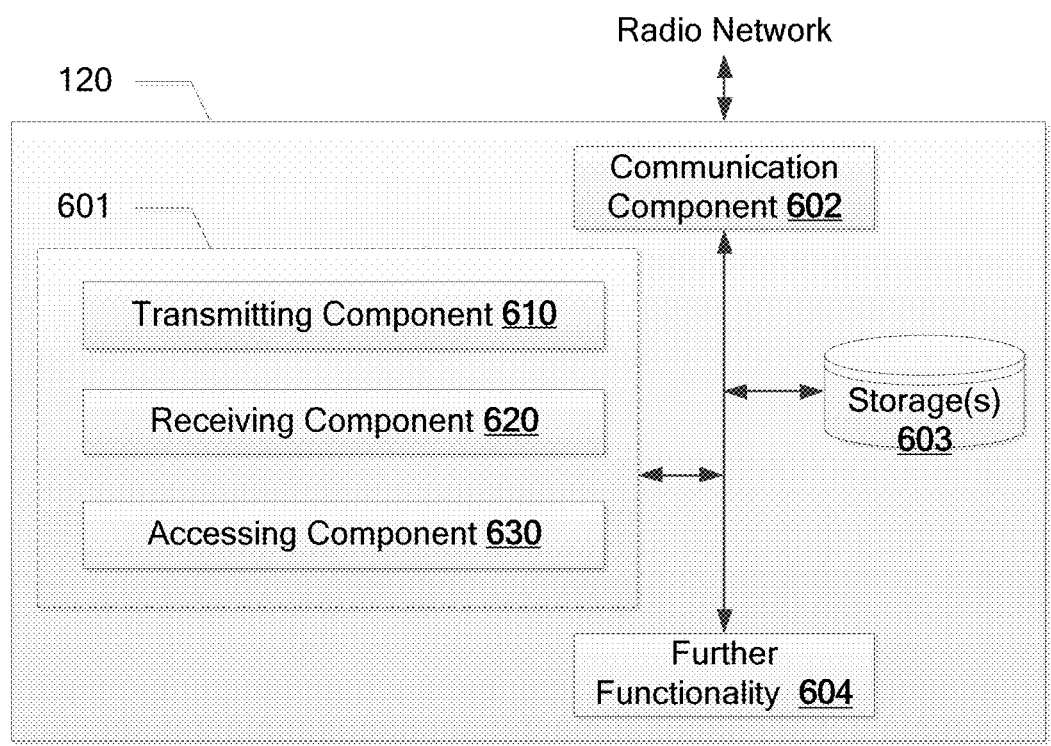
FIG. 6 illustrates a schematic block diagram of a UE 120 according to embodiments of the present disclosure.

FIG. 6 is a schematic block diagram of a UE 120 according to embodiments of the present disclosure. UE 120 is configured to perform random access to a network. The network here may be a 5G network, or any other appropriate radio network.

The part of UE 120 which is most affected by the adaptation of the herein described method, e.g., a part of the method 400, is illustrated as an arrangement 601, surrounded by a dashed line. The UE 120 and arrangement 601 may be further configured to communicate with other entities via a communication component 602 which may be regarded as part of the arrangement 601 (now shown). The communication component 602 comprises means for radio communication. The arrangement 601 or UE 120 may further comprise further functionality 604, such as functional components providing regular UE functions, and may further comprise one or more storage(s) 603.

The arrangement 601 could be implemented, e.g., by one or more of: a processor or a microprocessor and adequate software and memory for storing of the software, a Programmable Logic Device (PLD) or other electronic component (s) or processing circuitry configured to perform the actions described above, and illustrated, e.g., in FIG. 4. The arrangement 601 of the UE 120 may be implemented and/or described as follows.

Referring to FIG. 6, the UE 120 may comprise a transmitting component 610, a receiving component 620, and an accessing component 630.

The transmitting component 610 is configured to transmit a random access request containing a preamble to the radio network on a PRACH, of an uplink physical resource configuration, which could be one of e.g. a 5G uplink physical resource configuration operating at a higher frequency region, and a 5G supplementary uplink physical resource configuration operating at a lower frequency region. The preambles may be those described with reference to FIG. 2.

The receiving component 620 is configured to receive a random access response for it indicating the uplink physical resource configuration on whose PRACH the random access request was sent. How the random access response indicates the uplink physical resource configuration has been discussed in detail in description of FIG. 4, and will be reiterated here.

The accessing component 630 is configured to use resources indicated by the random access response for accessing to the network. For example, the accessing component 630 may proceed with transmitting MSG3 to gNB as shown in FIG. 2, as well as subsequent random access related processing, which will be apparent to those skilled in the art and thus will not be described in detail here.

It should be noted that two or more different units in this disclosure may be logically or physically combined. For example, the receiving component 610 and the transmitting component 630 may be combined as one single unit, e.g., a transceiver in the UE 120.

Figure 7:
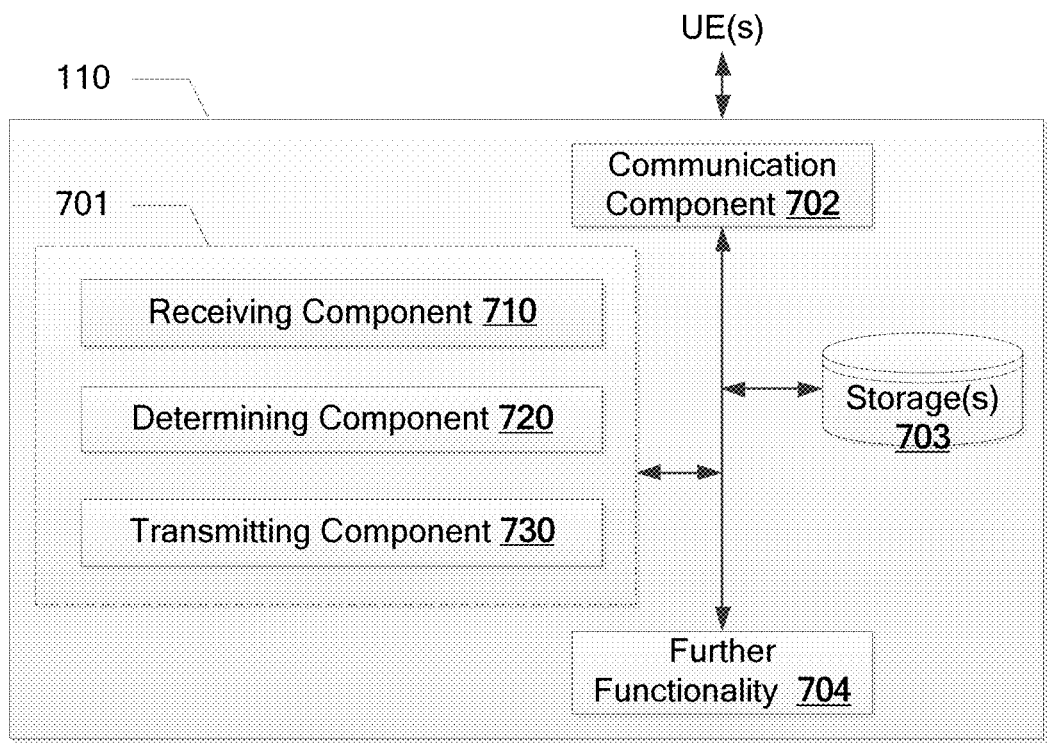
FIG. 7 illustrates a schematic block diagram of a base station 110 according to embodiments of the present disclosure.

FIG. 7 is a schematic block diagram of a base station 110 according to embodiments of the present disclosure. The base station 110 is configured to control random access of one or more user terminals to radio network. The network here may be a 5G network, or any other appropriate radio network.

The part of base station 110 which is most affected by the adaptation of the herein described method, e.g., a part of the method 500, is illustrated as an arrangement 701, surrounded by a dashed line. The base station 110 and arrangement 701 are further configured to communicate with other entities via a communication component 702 which may be regarded as part of the arrangement 701. The communication component 702 comprises means for radio communication, and may comprise means for, e.g., wired communication. The arrangement 701 or the base station 110 may further comprise further functionality 704, such as functional components providing regular base station functions, and may further comprise one or more storage(3) 703.

The arrangement 701 could be implemented, e.g., by one or more of: a processor or a microprocessor and adequate software and memory for storing of the software, a Programmable Logic Device (PLD) or other electronic component (s) or processing circuitry configured to perform the actions described above, and illustrated, e.g., in FIG. 5. The arrangement part of the base station 110 may be implemented and/or described as follows.

Referring to FIG. 7, the base station 110 may include a receiving component 710, a determining component 720, and a transmitting component 730.

The receiving component 710 is configured to receive, from the UE 120, a random access request containing a preamble on a PRACH, of an uplink physical resource configuration, which could be one of e.g. a 5G uplink physical resource configuration operating at a higher frequency region, and a 5G supplementary uplink physical resource configuration operating at a lower frequency region. The preamble may be those described with reference to FIG. 2.

The determining component 720 is configured to determine parameters for a random access response. Details on how to determine the parameters have been described in details with reference to FIGS. 3 and 4, and will be reiterated here.

The transmitting component 730 is configured to transmit the random access response for the UE 120, indicating the uplink physical resource configuration on whose PRACH the random access request was sent. How the random access response indicates the uplink physical resource configuration has been discussed in detail in description of FIG. 4, and will be reiterated here.

It should be noted that two or more different units in this disclosure may be logically or physically combined. For example, the receiving component 710 and the transmitting component 730 may be combined as one single unit, e.g., a transceiver in the BS 110.

Figure 8:
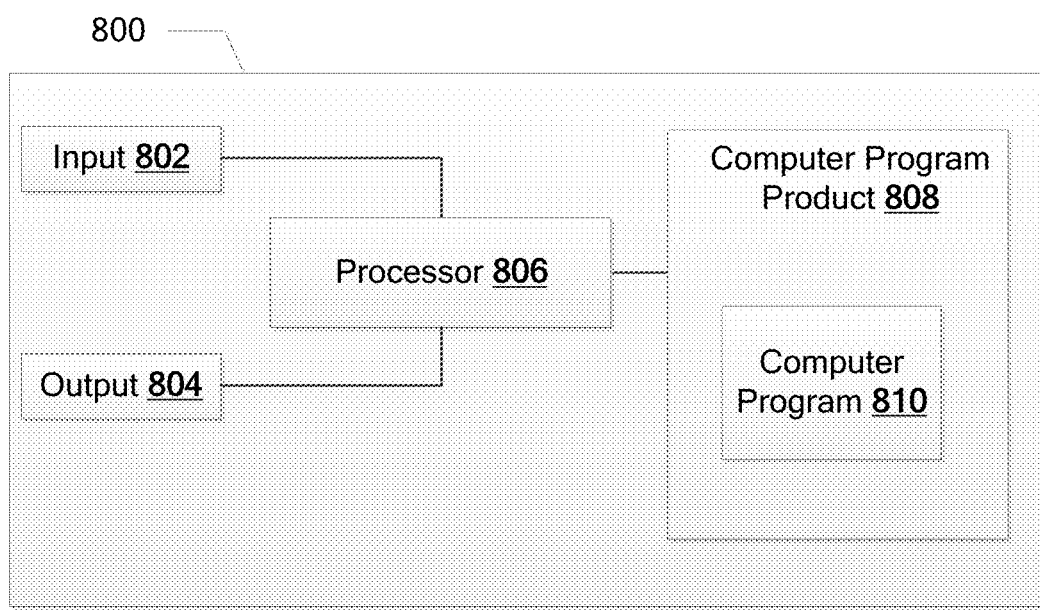
FIG. 8 schematically illustrates an embodiment of an arrangement 800 which may be used in the UE 120 or the base station 110.

FIG. 8 schematically shows an embodiment of an arrangement 800 which may be used in the UE 120 or the BS 110. Comprised in the arrangement 800 are here a processing component 806, e.g., with a Digital Signal Processor (DSP). The processing component 806 may be a single unit or a plurality of units to perform different actions of procedures described herein. The arrangement 800 may also comprise an input unit 802 for receiving signals from other entities, and an output unit 804 for providing signal (s) to other entities. The input unit and the output unit may be arranged as an integrated entity or as illustrated in the example of FIG. 6 or FIG. 7.

Furthermore, the arrangement 800 comprises at least one computer program product 808 in the form of a non-volatile or volatile memory, e.g., an Electrically Erasable Programmable Read-Only Memory (EEPROM), a flash memory and a hard drive. The computer program product 808 comprises a computer program 810, which comprises code/computer readable instructions, which when executed by the processing component 806 in the arrangement 800 causes the arrangement 800 and/or the BS or the UE in which it is comprised to perform the actions, e.g., of the procedure described earlier in conjunction with FIG. 3 and FIG. 4 or FIG. 5.

The computer program 810 may be configured as a computer program code structured in computer program modules. Hence, in an exemplifying embodiment when the arrangement 800 is used in the UE 120, the code in the computer program of the arrangement 800 when executed, will cause the processor 806 to perform the steps as described with reference to FIG. 4.

In another exemplifying embodiment when the arrangement 800 is used in the BS 110, the code in the computer program of the arrangement 800 when executed, will cause the processor 806 to perform the steps as described with reference to FIG. 5.

The processor 806 may be a single CPU (Central processing unit), but could also comprise two or more processing units. For example, the processor 806 may include general purpose microprocessors, instruction set processors and/or related chips sets and/or special purpose microprocessors such as Application Specific Integrated Circuit (ASICs). The processor 806 may also comprise board memory for caching purposes. The computer program 810 may be carried by a computer program product 808 connected to the processor 806. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

As a whole or by scenario, comparing to the prior art, with random access response's capability of indicating the uplink physical resource configuration on whose PRACH the random access request was sent, the UEs of different uplink physical resource configurations that involve preamble conflicts will be able to interpret the random access response correctly.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for a user equipment, UE, to perform random access to a radio network comprising an uplink physical resource configuration, UL, and supplementary physical resource configuration, SUL, comprising:
   transmitting, from the UE, a random access request, containing a preamble to the radio network on a physical random access channel, PRACH, of one of the uplink physical resource configuration or the supplementary uplink physical resource configuration;
   receiving, at the UE, a random access response for the UE indicating the physical resource configuration on whose PRACH the random access request was sent, wherein the indication is made by a Random Access Radio Network Temporary Identifier, RA-RNTI, in the random access response; and
   accessing, by the UE, the radio network based on information in the random access response, wherein the information comprises the physical resource configuration on whose PRACH the random access request was sent.

2. The method of claim 1, wherein the RA-RNTI is calculated as a function of an index of the uplink physical resource configuration.

3. The method of claim 1, wherein the RA-RNTI is calculated as follows:

$$RA\text{-}RNTI=1+t\_id+X*f\_id+X*Y*C\_id,$$

wherein t_id refers to an index of slot where the preamble transmission starts, f_id refers to an index of the PRACH within the slot, X is the maximum number of slots per radio frame of different uplink physical resource configurations, Y is the maximum number of PRACHs in frequency domain of different uplink physical resource configurations, $0 \leq t\_id < X$, $0 \leq f\_id < Y$, and C_id is the index of the uplink physical resource configuration on whose PRACH the random access request was sent.

4. A method for a network device to control random access of one or more User Equipments, UEs, to a radio network comprising an uplink physical resource configuration, UL, and a supplementary physical resource configuration, SUL, comprising:
   receiving, from the UE, a random access request containing a preamble on a physical random access channel, PRACH, of the uplink physical resource configuration or the supplementary uplink resource configuration;
   determining parameters for a random access response for the UE; and
   transmitting, by the network device, the random access response indicating the uplink physical resource configuration on whose PRACH the random access request was received from the UE wherein the indication is made by a Random Access Radio Network Temporary Identifier, RA-RNTI, in the random access response.

5. The method of claim 4, wherein the RA-RNTI is calculated as a function of an index of the uplink physical resource configuration.

6. The method of claim 4, wherein the RA-RNTI is calculated as follows:

$$RA\text{-}RNTI=1+t\_id+X*f\_id+X*Y*C\_id,$$

wherein t_id refers to an index of slot where the preamble transmission starts, f_id refers to an index of the PRACH within the slot, X is the maximum number of slots per radio frame of different uplink physical resource configurations, Y is the maximum number of PRACHs in frequency domain of different uplink physical resource configurations, $0 \leq t\_id < X$, $0 \leq f\_id < Y$, and C_id is the index of the uplink physical resource configuration on whose PRACH the random access request was sent.

7. The method of claim 4 further comprising:
allowing accessing, by the UE, to the radio network based on information in the random access response, wherein the information comprises the physical resource configuration on whose PRACH the random access request was sent.

8. A user equipment, UE, operative in a radio network having an uplink physical resource configuration, UL, and an uplink supplementary physical resource configuration, SUL, to perform random access to the radio network, comprising:
   a transmitter, configured to transmit a random access request containing a preamble to the radio network on a physical random access channel, PRACH, of one of the uplink physical resource configuration and the supplementary uplink physical resource configuration;
   a receiver, configured to receive a random access response for the UE indicating the uplink physical resource configuration on whose PRACH the random access request was sent wherein the indication is made by a Random Access Radio Network Temporary Identifier, RA-RNTI, in the random access response; and
   a processor, configured to enable the UE to access the radio network based on information in the random access response, wherein the information comprises the physical resource configuration on whose PRACH the random access request was sent.

9. The UE of claim 8, wherein the RA-RNTI is calculated as a function of an index of the uplink physical resource configuration.

10. A network device, operative in a radio network, to control random access of one or more User Equipment, UEs, to the radio network having an uplink physical resource configuration, UL, and a supplementary physical resource configuration, SUL, comprising:
   a receiver, configured to receive, from a UE, a random access request containing a preamble on a physical random access channel, PRACH, of one of the uplink physical resource configuration and the supplementary uplink physical resource configuration;
   a processor, configured to determine parameters for a random access response for the UE; and a transmitter, configured to transmit the random access response indicating the uplink physical resource configuration on whose PRACH the random access request was received from the UE, wherein the indication by a Random Access Radio Network Temporary Identifier, RA-RNTI, in the random access response.

11. The UE of claim 10, wherein the RA-RNTI is calculated as follows:

$$RA\text{-}RNTI = 1 + t\_id + X * f\_id + X * Y * C\_id,$$

wherein t_id refers to an index of slot where the preamble transmission starts, f_id refers to an index of the PRACH within the slot, X is the maximum number of slots per radio frame of different uplink physical resource configurations, Y is the maximum number of PRACHs in frequency domain of different uplink physical resource configurations, $0 \leq t\_id < X$, $0 \leq f\_id < Y$, and C_id is the index of the uplink physical resource configuration on whose PRACH the random access request was sent.

12. The network device of claim 10, wherein the RA-RNTI is calculated as a function of an index of the uplink physical resource configuration.

13. The network device of claim 10, wherein the RA-RNTI is calculated as follows:

$$RA\text{-}RNTI = 1 + t\_id + X * f\_id + X * Y * C\_id,$$

wherein t_id refers to an index of slot where the preamble transmission starts, f_id refers to an index of the PRACH within the slot, X is the maximum number of slots per radio frame of different uplink physical resource configurations, Y is the maximum number of PRACHs in frequency domain of different uplink physical resource configurations, $0 \leq t\_id < X$, $0 \leq f\_id < Y$, and C_id is the index of the uplink physical resource configuration on whose PRACH the random access request was sent.

14. The network device of claim 10, wherein the processor is further configured to allowing accessing, by the UE, to the radio network based on information in the random access response, wherein the information comprises the physical resource configuration on whose PRACH the random access request was sent.

* * * * *

UNITED STATES PATENT AND TRADEMARK OFFICE
CERTIFICATE OF CORRECTION

PATENT NO. : 10,548,170 B2
APPLICATION NO. : 16/370487
DATED : January 28, 2020
INVENTOR(S) : Christoffersson et al.

It is certified that error appears in the above-identified patent and that said Letters Patent is hereby corrected as shown below:

In the Specification

In Column 11, Lines 21-22, delete "receiving component 610 and the transmitting component 630" and insert -- receiving component 620 and the transmitting component 610 --, therefor.

Signed and Sealed this
Second Day of June, 2020

Andrei Iancu
*Director of the United States Patent and Trademark Office*